Dec. 13, 1960    K. W. JAY    2,963,862
FUEL SYSTEMS
Filed March 21, 1960    2 Sheets-Sheet 1
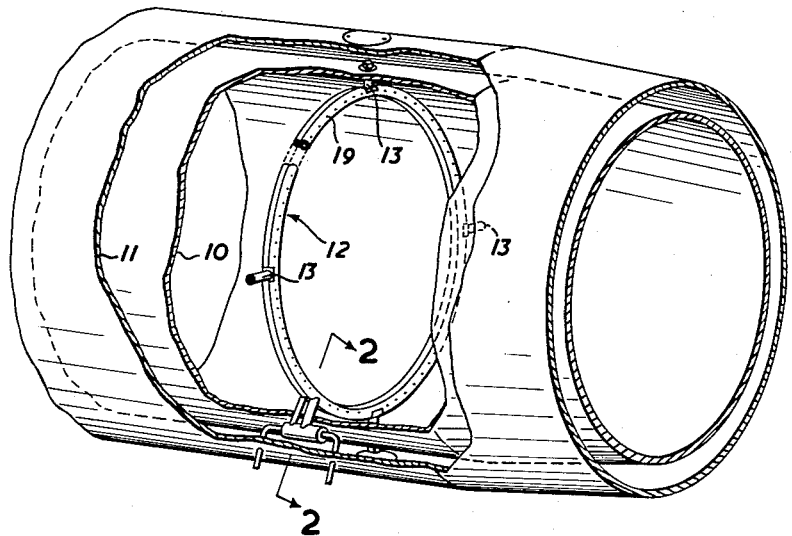
FIG. 1
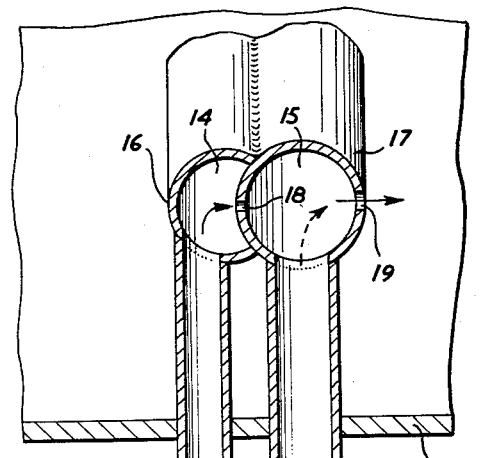
FIG. 2
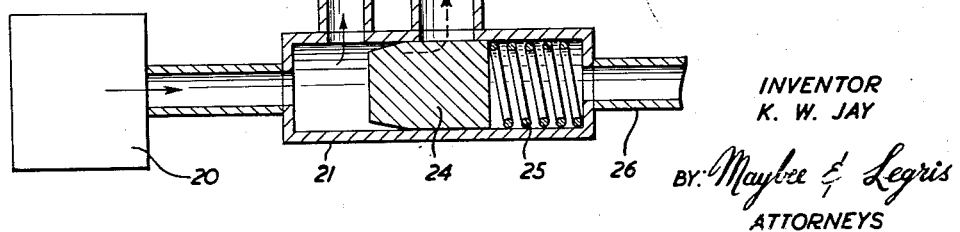
INVENTOR
K. W. JAY
BY
ATTORNEYS Dec. 13, 1960   K. W. JAY   2,963,862
FUEL SYSTEMS Filed March 21, 1960   2 Sheets-Sheet 2

INVENTOR
K. W. JAY
BY: *Maybee & Legris*
ATTORNEYS

United States Patent Office 2,963,862
Patented Dec. 13, 1960

2,963,862
FUEL SYSTEMS

Kenneth William Jay, Toronto, Ontario, Canada, assignor to Orenda Engines Limited, Malton, Ontario, Canada, a corporation Filed Mar. 21, 1960, Ser. No. 16,540
6 Claims. (Cl. 60—39.74)

This invention relates to a fuel system for discharging vaporizable fuel into a duct of a reaction propulsion unit. The system according to the invention is particularly useful in the afterburners of gas turbine aircraft engines.

In fuel systems for afterburners, it is necessary to provide a relatively wide range of fuel flow rates and it has been found that this wide range cannot be obtained by metering the fuel through simple nozzles since the range of fuel pressures available will not provide the required range of flow rates. Moreover, especially in afterburner installations, it has been found that at relatively low pressures the fuel vaporizes in the fuel discharge manifolds and creates vapour locks whereby uneven burning and hot spots occur in the tailpipe of the engine.

It is an object of the invention to provide a fuel distribution system which provides a wide range of flow rates while minimizing the problems encountered due to vaporization of the fuel in the system.

Figure 4:
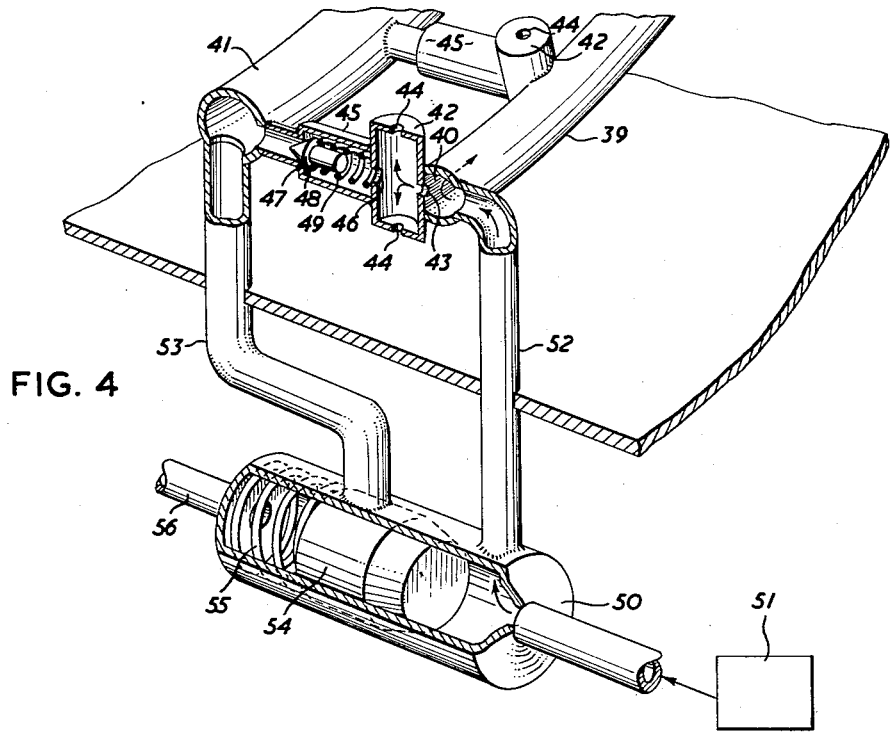
Figure 5:
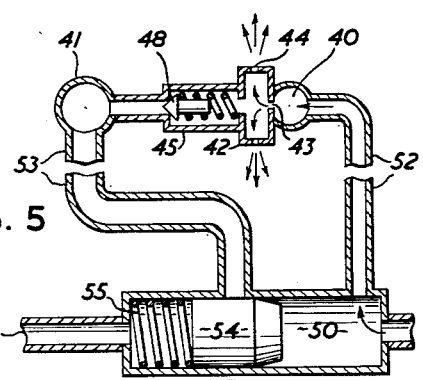
Figure 6:
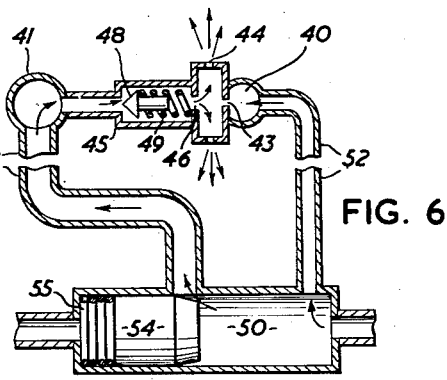
Figure 3:
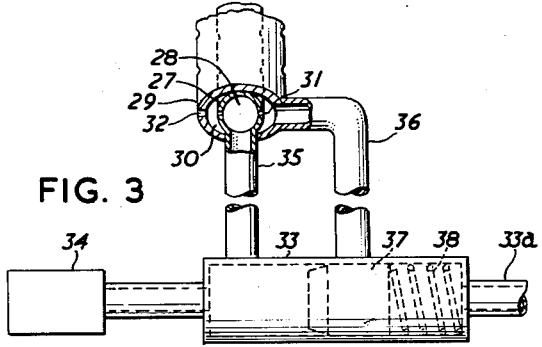

The invention will now be described by way of example with reference to the accompanying drawings in which:

Figure 1 is a broken away perspective view of part of the tailpipe of a gas turbine engine showing one embodiment of the invention, Figure 2 is a detail sectional elevation, on a larger scale, of the embodiment of the invention shown in Figure 1, Figure 3 is a detail sectional elevation similar to Figure 2 but showing a second embodiment of the invention, Figure 4 is a broken away detail perspective view of a third embodiment of the invention, and Figures 5 and 6 are diagrams showing two operating conditions of the embodiment of Figure 4.

Referring now to the drawings, a section of a tailpipe of a gas turbine engine is indicated at 10 and is surrounded by a shroud 11. Mounted in the jet pipe is a fuel distribution manifold indicated generally at 12, the manifold 12 being provided with spigots 13 received in appropriate apertures in the jet pipe 10. Referring now to Figure 2, it will be seen that the manifold 12 comprises two chambers, a primary chamber 14 and a secondary chamber 15. The primary chamber 14 is made by bending a hollow member 16 into the form of a closed figure, in the example shown the figure is a circle, and then welding it to a tubular member 17 which has also been bent into the form of a circle. The bore of the hollow member 16 provides the primary chamber 14 and the bore of the tubular member 17 provides the secondary chamber 15. The primary chamber 14 communicates with the secondary chamber 15 through a plurality of primary metering orifices 18 which are spaced apart around the circumference of the circle formed by the chambers. The secondary chamber 15 discharges fuel into the tailpipe 10 through a plurality of secondary orifices 19 also distributed around the periphery of the circle as shown in Figure 1.

The system is provided with fuel from fuel supply means indicated diagrammatically at 20 which is connected to a cylinder 21. A first connection 22 extends between the cylinder 21 and the primary chamber 14 and a second connection 23, independent of the primary chamber 14, extends between the secondary chamber 15 and the cylinder 21. A piston 24 is slidable in the cylinder 21 and is biased to the position shown in Figure 2 by means of a compression spring 25. A drain 26 is provided at the right hand end of the cylinder. The piston 24 and spring 25 together provide valve means responsive to the pressure of the fuel delivered by the fuel supply means 20.

The operation of the embodiment so far described is as follows. When a low quantity of fuel is required, the fuel pressure in the cylinder 21 is insufficient to move the piston 24 from the position shown in Figure 2. Fuel thus flows from the fuel supply means 20, through the cylinder 21, along the first connection 22 into the primary chamber 14, through the primary metering orifices 18 into the secondary chamber 15 and out through the secondary metering orifices 19 into the tailpipe 10. During this flow, the secondary chamber 15 is maintained full of fluid. However, when a greater fuel flow is required, due to the restricted amount of fuel which may be passed through the metering orifices 18, back pressure will build up in the cylinder 21 and will move the piston 24 to the right so that fuel may pass along the second connection 23 into the secondary chamber 15 and out through the secondary metering orifices 19 into the duct 10.

The sum of the cross-sectional areas of the primary metering orifices 18 is less than the sum of the cross-sectional areas of the secondary metering orifices 19. It follows that, when the piston 24 is in the position shown in Figure 2, fuel is metered solely by the primary metering orifices 18 even though the secondary chamber 15 is full of fuel. However, when the piston 24 moves to permit fuel to flow along the second connection 23, the fuel will be metered by the secondary metering orifices 19 which, in sum, have a greater cross-sectional area than the sum of the cross-sectional area of the primary metering orifices so that more fuel will be supplied to the duct. Moreover, since fuel is being supplied to the secondary chamber 15 through a multiplicity of orifices 18 spaced around its periphery, any vaporization of fuel which occurs in the secondary chamber will not affect the distribution of the fuel discharged into the tailpipe as it would were the fuel being introduced into the chamber from one supply point. It follows that a homogeneous mixture of fuel and fuel vapour will pass into the jet pipe 10 through all the secondary metering orifices 19.

A further advantage of the first embodiment so far described is that there will be no drop in pressure or time lag in the system as the piston 24 moves to permit fuel to flow through the second connection 23 since the secondary chamber 15 is already full of fuel when the piston moves to open the second connection.

Turning now to Figure 3, the compound distribution manifold there shown comprises a first tube 27, the bore of which provides a primary chamber 28, and a second tube 29, the bore of which provides a secondary chamber 30 within which is received the tube 27. Primary metering orifices 31 are provided in the wall of the first tube 27 and secondary metering orifices 32 are provided in the wall of the second tube 29. The sum of the cross-sectional areas of the secondary metering orifices 32 is greater than the sum of the cross-sectional areas of the primary metering orifices 31. A cylinder 33 is connected to fuel supply means 34 while a first connection 35 connects the primary chamber 28 to the cylinder 33 and a second connection 36 connects the cylinder 33 to the secondary chamber 30. A piston 37 is slidable in the cylinder 33 and is controlled by a compression spring 38. A drain 33a is provided in the cylinder 33 behind the piston 37.

The operation of the embodiment of Figure 3 is similar to the operation of the embodiment of Figures 1 and 2. When a low rate of fuel flow is required, the fuel enters the cylinder 33 and passes along the first connection 35 into the primary chamber 28. The fuel then passes through the primary metering orifices 31 into the secondary chamber 30, which is full of fuel, or fuel and vapour, and thence through the secondary metering orifices 32 into the duct. When the fuel pressure in the cylinder 33 increases, the piston 37 is moved to the right and fuel flows through the second connection 36 into the secondary chamber 30 and thence through the secondary metering orifices 32. This embodiment has the same advantages as the embodiment described with reference to Figures 1 and 2.

Referring now to Figures 4, 5 and 6, these figures show an embodiment of the invention suitable for use where severe fuel boiling conditions are encountered. The system comprises a first tube 39 bent to form a closed figure, in this example, and normally, a circle; the bore of the tube 39 forms a primary chamber 40. A second tube indicated at 41 provides a first transfer conduit and, interposed between the tube 39 and the first transfer conduit 41, is a plurality of cylindrical secondary chamber elements, two of which are indicated at 42. The chamber elements 41 are spaced around the peripheries of the circles formed by the tubes 39 and 41, are welded directly to the pipe 39 and communicate with the primary chamber 40 through a plurality of primary metering orifices 43. The secondary chamber elements have secondary metering orifices 44 in their otherwise closed ends for the discharge of fuel to the duct. The secondary chamber elements 42 are connected to the first transfer conduit 41 by means of second transfer conduits 45 which communicate with the secondary chamber elements through the ports 46. Each secondary transfer conduit is provided with a valve seat 47 and a valve member 48 urged against the seat 47 by means of a compression spring 49.

A cylinder indicated at 50 is connected to fluid supply means 51. A first connection 52 connects the cylinder 50 with the primary chamber 40 while a second connection 53 connects the first transfer conduit 41 with the cylinder 50. A piston 54 is slidably mounted in the cylinder 50 and is biased to the position shown in Figure 4 by a compression spring 55. A drain 56 is provided to the cylinder 50. In the position to which the piston 54 is normally biased, the piston 54 cuts off the fuel supply from the second connection 53 while permitting fuel to flow through the first connection 52 to the primary chamber 40.

The operation of the embodiment shown in Figure 4 will now be described with reference to Figures 5 and 6. Under conditions of low fuel flow, as shown in Figure 5, fuel enters the cylinder 50, passes up the first connection 52 into the primary chamber 40 and thence through the primary metering orifices 43 into the secondary chamber elements 42; the fuel is then discharged through the secondary metering orifices 44. The sum of the cross-sectional areas of the secondary metering orifices 44 is greater than the sum of the cross-sectional areas of the primary metering orifices 43. If now the fuel pressure in the cylinder 50 increases, the piston 54 will move to the left as shown in Figure 6 and fuel will flow up the second connection 53 into the first transfer conduit 41. When the transfer conduit 41 has been filled with fuel, pressure will develop therein and will force the valve members 48 off their seats against the springs 49 so that fuel may then flow from the first transfer conduit 41 through the second transfer conduits 45 into the secondary chamber elements; the fuel is then discharged through the secondary metering orifices 44.

In the state shown in Figure 5, with low fuel flow rates, the fuel is metered exclusively by the primary metering orifices 43. In the position shown in Figure 6, however, the fuel is metered by the large metering orifices 44 thereby giving an increased rate of fuel flow.

At low fuel flows the fuel may boil in the secondary chamber elements 42 but, since the elements are not interconnected, there is no means whereby fuel vapour forming in one or more of the elements can collect together to upset distribution. It follows that a mixture of fuel and fuel vapour will be discharged from each secondary chamber element 42 without the formation of hot spots or uneven burning in the duct.

It will be seen that the invention provides a simple system whereby a wide range of fuel flows may be obtained without the production of hot spots and uneven burning due to the vaporization of fuel in the system.

It will be understood that the forms of the invention herewith shown and described are preferred examples and that various modifications may be carried out without departing from the spirit of the invention or the scope of the appended claims.

What I claim as my invention is:

1. A system for discharging vaporizable fuel into a duct of a reaction propulsion unit, comprising a hollow member bent to form a closed figure and to provide a primary chamber, secondary chamber means secured to the member and communicating with the primary chamber through a plurality of primary metering orifices spaced around said figure, a plurality of spaced secondary metering orifices in said secondary chamber means for the discharge of fuel into said duct, the sum of the cross-sectional areas of the primary orifices being less than the sum of the cross-sectional areas of the secondary orifices, fuel supply means, a first connection between the fuel supply means and the primary chamber, a second connection independent of the primary chamber between the fuel supply means and the secondary chamber means, and pressure responsive valve means associated with the second connection to normally prevent fuel flow therethrough but permitting fuel to flow through the second connection into the secondary chamber means upon the attainment of a predetermined pressure in the fuel supply means.

2. A system for discharging vaporizable fuel into a duct of a reaction propulsion unit, comprising a first hollow member bent to form a closed figure and to provide a primary chamber, a second hollow member bent to form a closed figure similar to the first mentioned figure and to provide a secondary chamber, the members being secured together and the chambers communicating with one another through a plurality of primary metering orifices spaced around said figures, a plurality of spaced secondary metering orifices in the secondary chamber for the discharge of fuel into the duct, the sum of the cross-sectional areas of the primary orifices being less than the sum of the cross-sectional areas of the secondary orifices, fuel supply means, a first connection between the fuel supply means and the primary chamber, a second connection independent of the primary chamber between the fuel supply means and the secondary chamber, and pressure responsive valve means associated with the second connection to normally prevent fuel flow therethrough but permitting fuel to flow through the second connection into the secondary chamber means upon the attainment of a predetermined pressure in the fuel supply means.

3. A system for discharging vaporizable fuel into a duct of a reaction propulsion unit, comprising a tubular member bent to form a closed figure, the bore of the tubular member forming a primary chamber, a second tubular member bent to form a closed figure, the bore of the second tubular member providing a secondary chamber, the first tubular member being secured wholly within the secondary chamber, the primary chamber communicating with the secondary chamber through a plurality of primary metering orifices spaced around said first tubular member, a plurality of spaced secondary metering orifices in said secondary chamber and spaced around said second tubular member for discharge of fuel into said duct, the sum of the cross-sectional areas of the primary orifices being less than the sum of the cross-sectional areas of the secondary orifices, fuel supply means, a first connection between the fuel supply means and the primary chamber, a second connection independent of the primary chamber between the fuel supply means and the secondary chamber, and pressure responsive valve means associated with the second connection to normally prevent fuel flow therethrough but permitting fuel to flow through the second connection into the secondary chamber upon the attainment of a predetermined pressure in the fuel supply means.

4. A system for discharging vaporizable fuel into a duct of a reaction propulsion unit, comprising a first tubular member bent to form a closed figure, the bore of the tubular member forming a primary chamber, a second tubular member bent to form a closed figure, the bore of the second tubular member providing a first transfer conduit, a plurality of discrete secondary chamber elements interposed between the first tubular member and the second tubular member, said elements being spaced apart around the peripheries of the members and communicating with the primary chamber through a plurality of primary metering orifices in said first tubular element, secondary metering orifices in said secondary chamber elements for the discharge of fuel into said duct, the sum of the cross-sectional areas of the primary orifices being less than the sum of the cross-sectional areas of the secondary orifices, second transfer conduits interconnecting the first transfer conduit and the secondary chamber elements, fuel supply means, a first connection between the fuel supply means and the primary chamber, a second connection independent of the primary chamber between the fuel supply means and the first transfer conduit and pressure responsive valve means associated with the second connection to normally prevent fuel flow therethrough but permitting fuel to flow through the second connection into the first transfer conduit upon the attainment of a predetermined pressure in the fuel supply means.

5. A system according to claim 4, including a spring-loaded non-return valve in each second transfer conduit, means to hold each of said non-return valves normally closed to prevent fuel from flowing from the secondary chamber elements into said first transfer conduit, the non-return valves opening upon the attainment of a predetermined fuel pressure in the first transfer conduit to permit fuel to flow from the first transfer conduit, through the second transfer conduits and into the secondary chamber elements.

6. A system for discharging vaporizable fuel into a duct of a reaction propulsion unit, comprising a hollow member bent to form a closed figure and to provide a primary chamber, secondary chamber means secured to the member and communicating with the primary chamber through a plurality of primary metering orifices spaced around said figure, a plurality of spaced secondary metering orifices in said secondary chamber means for the discharge of fuel into said duct, the sum of the cross-sectional areas of the primary orifices being less than the sum of the cross-sectional areas of the secondary orifices, fuel supply means, a cylinder connected to said fuel supply means, a first connection between the cylinder and the primary chamber, a second connection independent of the primary chamber between said cylinder and the secondary chamber means, said second connection opening into said cylinder at a point spaced from the point at which the first connection opens into the cylinder, a piston slidable in said cylinder, and spring means normally holding said piston in a position to block said second conduit but to leave said first conduit open, the attainment of a predetermined pressure in the cylinder moving the piston against said spring means to open the second connection whereby fuel may flow therethrough into the secondary chamber means.

No references cited.